(12) United States Patent
Teschke

(10) Patent No.: US 12,523,310 B2
(45) Date of Patent: Jan. 13, 2026

(54) PRESSURE ADJUSTMENT APPARATUS

(71) Applicant: Norgren GmbH, Alpen (DE)

(72) Inventor: Ulrich Teschke, Rheinberg (DE)

(73) Assignee: NORGREN GMBH, Alpen (DE)

( * ) Notice: Subject to any disclaimer, the term of this patent is extended or adjusted under 35 U.S.C. 154(b) by 238 days.

(21) Appl. No.: 18/550,705

(22) PCT Filed: Mar. 17, 2022

(86) PCT No.: PCT/EP2022/056967
§ 371 (c)(1),
(2) Date: Sep. 15, 2023

(87) PCT Pub. No.: WO2022/195006
PCT Pub. Date: Sep. 22, 2022

(65) Prior Publication Data
US 2024/0044413 A1 Feb. 8, 2024

(30) Foreign Application Priority Data

Mar. 18, 2021 (DE) ...................... 10 2021 106 601.8

(51) Int. Cl.
*F16K 11/16* (2006.01)
*B60N 2/66* (2006.01)
*B60N 2/90* (2018.01)

(52) U.S. Cl.
CPC ............ *F16K 11/168* (2013.01); *B60N 2/665* (2015.04); *B60N 2/914* (2018.02); *F16K 11/161* (2013.01)

(58) Field of Classification Search
CPC ....... B60N 2/665; B60N 2/914; F16K 11/168; F16K 11/163; F16K 11/161; F16K 11/16; F16K 11/14; F16K 11/04
See application file for complete search history.

(56) References Cited

U.S. PATENT DOCUMENTS 3,480,039 A * 11/1969 Petersen ............... F16K 11/168
137/596.2
3,756,284 A * 9/1973 Breunich .............. F16K 11/168
137/636

(Continued)

FOREIGN PATENT DOCUMENTS

CN 208885672 U * 5/2019 ............. F16K 31/52
DE 102011102701 A1 * 11/2012 ............. B60N 2/914

(Continued)

OTHER PUBLICATIONS

International Search Report and Written Opinion prepared by the European Patent Office in International Application No. PCT/EP2022/056967, dated Jul. 8, 2022.

*Primary Examiner* — David Colon-Morales
(74) *Attorney, Agent, or Firm* — McDonnell Boehnen Hulbert & Berghoff LLP

(57) ABSTRACT

A pressure adjustment apparatus includes a compartment and a valve arrangement for regulating compartment pressure. The valve arrangement includes an inlet for connection to a pressurized fluid source with an inlet valve, an outlet with an outlet valve, a compartment port connecting the compartment, and a compartment valve controlling fluid flow into and/or out of the compartment. The compartment valve is configured for simultaneous actuation to an open position with the inlet and/or outlet valve, enabling fluid flow into or out of the compartment when either the inlet or outlet valve is open. The apparatus may include actuators for the valves, resilient biasing arrangements, a pressure relief valve, and can be configured as a unit with multiple valve arrangements connected to shared conduits, with features for sealing and compactness.

19 Claims, 5 Drawing Sheets

(56) References Cited

U.S. PATENT DOCUMENTS

| | | | | |
|---|---|---|---|---|
| 4,254,790 A * | 3/1981 | Eriksson | ............ | G05D 16/0404 |
| | | | | 137/100 |
| 4,421,135 A * | 12/1983 | Harshman | ............ | F15B 13/0422 |
| | | | | 137/868 |
| 4,491,364 A * | 1/1985 | Hattori | ............ | B60N 2/914 |
| | | | | 297/284.6 |
| 4,570,676 A * | 2/1986 | Nishio | ............ | F16K 11/24 |
| | | | | 297/284.6 |
| 4,840,425 A * | 6/1989 | Noble | ............ | A61G 7/05776 |
| | | | | 297/DIG. 3 |
| 4,938,528 A * | 7/1990 | Scott | ............ | A47C 7/467 |
| | | | | 297/284.6 |
| 6,422,087 B1 * | 7/2002 | Potter | ............ | B60N 2/665 |
| | | | | 73/731 |
| 6,682,059 B1 * | 1/2004 | Daniels | ............ | F16K 99/0036 |
| | | | | 297/284.6 |
| 6,705,079 B1 * | 3/2004 | Tabor | ............ | F15B 11/006 |
| | | | | 60/469 |
| 9,353,771 B2 * | 5/2016 | Studer | ............ | F15B 13/0426 |
| 9,725,177 B2 * | 8/2017 | John | ............ | B64D 11/0647 |
| 10,781,808 B2 * | 9/2020 | Kawamura | ............ | A61B 5/0235 |
| 11,077,781 B2 * | 8/2021 | Beuschel | ............ | F16K 31/1223 |
| 11,420,545 B2 * | 8/2022 | Inoue | ............ | B60N 2/665 |
| 11,466,748 B2 * | 10/2022 | Malmborg | ............ | F16F 9/34 |
| 11,859,727 B2 * | 1/2024 | Beuschel | ............ | B60N 2/914 |
| 12,265,405 B2 * | 4/2025 | Stasinski | ............ | G05D 16/0644 |
| 2004/0055455 A1 | 3/2004 | Tabor et al. | | |
| 2011/0227388 A1 * | 9/2011 | Bocsanyi | ............ | B60N 2/914 |
| | | | | 297/452.41 |
| 2014/0232155 A1 * | 8/2014 | Bocsanyi | ............ | B60N 2/914 |
| | | | | 297/284.6 |
| 2015/0034847 A1 * | 2/2015 | Kotani | ............ | F04B 45/047 |
| | | | | 251/57 |
| 2015/0165940 A1 * | 6/2015 | Schnell | ............ | B32B 37/0076 |
| | | | | 297/284.3 |
| 2017/0274801 A1 * | 9/2017 | Shibata | ............ | B60N 2/914 |
| 2020/0101883 A1 | 4/2020 | Beuschel | | |

FOREIGN PATENT DOCUMENTS

| | | | | |
|---|---|---|---|---|
| EP | 0473030 A1 * | 3/1992 | .......... | F15B 13/0402 |
| FR | 2988344 A1 * | 9/2013 | ............ | B60N 2/665 |
| FR | 3034726 A1 * | 10/2016 | ............ | B60N 2/665 |
| JP | S54 111806 U | 6/1979 | | |
| JP | S5842622 Y2 * | 9/1983 | | |
| WO | WO-2008135186 A1 * | 11/2008 | ............ | B60N 2/914 |
| WO | WO-2018142655 A1 * | 8/2018 | ............ | G10L 25/78 |

* cited by examiner

PRESSURE ADJUSTMENT APPARATUS

CROSS-REFERENCE TO RELATED APPLICATIONS

This application a U.S. National Phase Application pursuant to 35 U.S.C § 371 of International Application No. PCT/EP2022/056967 filed on Mar. 17, 2022, which claims priority to German Patent Application No. DE 10 2021 106 601.8 filed on Mar. 18, 2021, the entire contents of all of which are hereby incorporated by reference.

FIELD

The present invention relates to a pressure adjustment apparatus, and to a valve arrangement for a pressure adjustment apparatus for a compartment.

BACKGROUND

Pressure adjustment of a pressurised compartment is commonly carried out by actuation of an inlet valve located between a pressurised fluid source and the pressurised compartment, and an outlet valve located between the pressurised compartment and a fluid outlet. Actuation of the inlet valve is used to fill the compartment with fluid to increase the compartment pressure; actuation of the outlet valve is used to release fluid from the compartment to decrease the compartment pressure. When neither valve is actuated, both valves are in a closed position, and any fluid introduced into the compartment is kept therein. It is usual for the inlet and outlet valves in such an arrangement to be resiliently biased towards a closed position, e.g. by springs. Actuation of the valves to an open position is carried out by external forces opposing the spring force. In such an arrangement, it is known to use a pressure relief valve to limit the compartment pressure.

Such an arrangement has known disadvantages that inhibit the intended function of the pressure adjustment apparatus to maintain a desired compartment pressure at a constant level for as long as possible.

For example, a leakage at the inlet valve would cause the pressure at the compartment to rise until the opening pressure of a pressure relief valve is reached. A leakage at the pressure relief valve or the outlet valve would cause the pressure of the compartment to drop. The risk of leakage out of the pressure relief valve is particularly high when the compartment pressure is close to the opening pressure of the pressure relief valve. This makes it difficult to precisely predict the maximum pressure that can be maintained at the compartment for a substantial length of time.

In addition, an unwanted increase in pressure (e.g. due to an external load on the compartment) can, if sufficiently large, cause the pressure relief valve to open and so allow fluid to escape the apparatus. After such relief via the pressure relief valve, the pressure of the compartment is lower than before, and no longer at the desired level. Refilling via actuation of the inlet valve is then required.

The present teachings seek to overcome or at least mitigate the problems of the prior art.

SUMMARY

According to the present teachings there is provided a pressure adjustment apparatus comprising a compartment and a valve arrangement for controlling the pressure of the compartment. The valve arrangement comprises an inlet, for connecting the valve arrangement to a pressurised fluid source, and an inlet valve, for controlling the flow of fluid from the fluid source into the valve arrangement; an outlet, for releasing fluid from the valve arrangement, and an outlet valve, for controlling the flow of fluid out of the valve arrangement; a compartment port by which the compartment is connected to the valve arrangement; and a compartment valve for controlling the flow of fluid into and/or out of the compartment. The compartment valve is configured for simultaneous actuation to an open position with the inlet valve and/or the outlet valve, such that when either the inlet valve or the outlet valve is in an open position, the compartment valve is in an open position, such that the flow of fluid into and/or out of the compartment is allowed.

Providing a valve to control the flow of fluid to and/or from the compartment reduces the risk of leakage from the inlet valve increasing the pressure within the compartment, and/or reduces the risk of leakage from the outlet valve reducing the pressure within the compartment. The pressure within the compartment is therefore better controlled, and can be more precisely predicted. The pressure within the compartment can be more easily maintained at the desired level, avoiding the need for further adjustment, for example by operation of the inlet valve. Simultaneous actuation of the compartment valve with the inlet or outlet valve leads to efficient operation.

In exemplary embodiments, the valve arrangement further comprises an inlet actuator for moving the inlet valve to an open position in which the flow of fluid from the fluid source into the valve arrangement is enabled; and an outlet actuator for moving the outlet valve to an open position in which the flow of fluid out of the valve arrangement is enabled; and one or both of the inlet actuator and the outlet actuator is configured to move the compartment valve to an open position in which the flow of fluid to and/or from the compartment is enabled.

Advantageously, the compartment valve can be operated at the same time as the inlet or outlet valve—only a single action of each actuator is needed in order to increase or decrease the compartment pressure—the compartment valve need not be actuated separately. This is of particular advantage where the inlet and outlet actuators are controlled directly by an operator (i.e. the operator applies an actuating force) rather than e.g. electronically, as only a single action is required on the part of the operator to increase or decrease the compartment pressure.

In exemplary embodiments, the valve arrangement comprises a valve actuator, and the inlet actuator and the outlet actuator are integral to the valve actuator.

A single integrated actuator advantageously simplifies the valve arrangement, reducing the required number of components.

In exemplary embodiments, the pressure adjustment apparatus further comprises a housing defining an interior and an exterior, wherein the valve actuator comprises an interior portion located within the interior of the housing, and an exterior portion located to the exterior of the housing, and wherein the exterior portion is pivotably connected to the housing.

The exterior portion of the valve actuator, and its pivotable connection to the housing, provide a simple rocker by which the compartment pressure can be adjusted.

In exemplary embodiments, the pressure adjustment apparatus further comprises a resilient biasing arrangement configured to resiliently bias the inlet actuator and the outlet actuator towards an inactive position in which the inlet valve, the outlet valve and the compartment valve are in a closed position.

In exemplary embodiments, the inlet valve, the outlet valve and the compartment valve are resiliently biased towards a closed position.

Without actuation of the valves, the valves return to a closed state, so that the compartment pressure remains at the level to which it has been adjusted until further actuation of the valves occurs.

In exemplary embodiments, the valve arrangement further comprises a pressure relief valve in fluid communication between the inlet and the compartment port, such that pressure at the compartment port is limited by the pressure relief valve In the event of a leakage in the inlet valve, fluid can leave the valve arrangement at the pressure release valve, without affecting the pressure at the compartment port.

In exemplary embodiments, the outlet valve comprises the pressure relief valve.

Incorporation of the pressure relief valve in the outlet valve makes the valve arrangement advantageously compact.

In exemplary embodiments, the valve arrangement comprises a first compartment valve for controlling the flow of fluid into the compartment, and a second compartment valve for controlling the flow of fluid out of the compartment.

Providing a valve to control the flow of fluid to and from the compartment reduces the risk of leakage from the inlet valve increasing the pressure within the compartment, as well as lowering the risk of leakage from the outlet valve reducing the pressure within the compartment. Control of the pressure within the compartment is therefore increased, and can be even more precisely predicted. The pressure within the compartment can be more easily maintained at the desired level, avoiding the need for further adjustment.

In exemplary embodiments, the valve arrangement further comprises an inlet actuator for moving the inlet valve to an open position in which the flow of fluid from the fluid source into the valve arrangement is enabled; and an outlet actuator for moving the outlet valve to an open position in which the flow of fluid out of the valve arrangement is enabled; wherein the inlet actuator is configured to move the first compartment valve to an open position in which the flow of fluid to the compartment is enabled; and the outlet actuator is configured to move the second compartment valve to an open position in which the flow of fluid from the compartment is enabled.

Advantageously, each of the compartment valves can be operated at the same time as the respective inlet or outlet valve, i.e. only a single action of each actuator is needed in order to increase or decrease the compartment pressure—the compartment valves need not be actuated separately. This is of particular advantage where the inlet and outlet actuators are controlled directly by an operator (i.e. the operator applies an actuating force) rather than e.g. electronically, as only a single action is required on the part of the operator to increase or decrease the compartment pressure. The separate actuators allow freedom of design, as the location of each actuator is not dictated by the location of the other.

There is also provided a pressure adjustment unit comprising two or more pressure adjustment apparatus as described above, the pressure adjustment unit comprising an inlet conduit for connecting each valve arrangement to a pressurised fluid source. The inlet of each valve arrangement comprises an inlet connector; and the inlet of each valve arrangement is connected to the inlet conduit by the respective inlet connector.

In exemplary embodiments, the pressure adjustment unit further comprises an outlet conduit for releasing fluid from each valve arrangement; wherein the outlet of each valve arrangement comprises an outlet connector; and wherein the outlet of each valve arrangement is connected to the outlet conduit by the respective outlet connector.

The shared inlet and outlet conduits advantageously allow a common fluid supply and a common fluid outlet to be used, providing a more compact arrangement.

In exemplary embodiments, each inlet connector and/or outlet connector comprises a projection configured to engage the respective inlet conduit or outlet conduit, and each projection is substantially circular in cross-section.

The circular shape of the projections makes it easy to attach the conduit to the connectors.

In exemplary embodiments, each projection comprises at least one barb configured for engagement with the respective inlet or outlet conduit.

The barb or barbs of the projections promote engagement of the connectors with the conduit.

In exemplary embodiments, each conduit defines receiving portions each configured to receive a respective inlet connector or outlet connector, wherein each receiving portion defines a location portion shaped to correspond with a corresponding location portion of an inlet or outlet connector.

Advantageously, the correspondingly shaped location portions limit rotation of the connectors in relation to the conduits, so inhibiting the connections between the valve arrangements and the conduits becoming loose or leaking.

There is further provided a valve arrangement for a pressure adjustment apparatus for a compartment, the valve arrangement comprising an inlet, for connecting the valve arrangement to a pressurised fluid source, and an inlet valve, for controlling the flow of fluid from the fluid source into the valve arrangement; an outlet, for releasing fluid from the valve arrangement, and an outlet valve, for controlling the flow of fluid out of the valve arrangement; a compartment port for connecting said compartment to the valve arrangement; and compartment valve for controlling the flow of fluid into and/or out of said compartment. The compartment valve is configured for simultaneous actuation to an open position with the inlet valve and/or the outlet valve, such that when either the inlet valve or the outlet valve is in an open position, the compartment valve is in an open position, such that the flow of fluid into and/or out of the compartment is allowed.

Providing a valve to control the flow of fluid to and/or from the compartment reduces the risk of leakage from the inlet valve increasing the pressure within the compartment, and/or reduces the risk of leakage from the outlet valve reducing the pressure within the compartment. The pressure within the compartment is therefore better controlled, and can be more precisely predicted. The pressure within the compartment can be more easily maintained at the desired level, avoiding the need for further adjustment, for example by operation of the inlet valve. Simultaneous actuation of the compartment valve with the inlet or outlet valve leads to efficient operation.

In exemplary embodiments, the valve arrangement further comprises an inlet actuator for moving the inlet valve to an open position in which the flow of fluid from the fluid source into the valve arrangement is enabled; and an outlet actuator for moving the outlet valve to an open position in which the flow of fluid out of the valve arrangement is enabled; wherein one or both of the inlet actuator and the outlet actuator is configured to move the compartment valve to an open position in which the flow of fluid to and/or from said compartment is enabled.

Advantageously, the compartment valve can be operated at the same time as the inlet or outlet valve, i.e. only a single action of each actuator is needed in order to increase or decrease the compartment pressure—the compartment valve need not be actuated separately. This is of particular advantage where the inlet and outlet actuators are controlled directly by an operator (i.e. the operator applies an actuating force) rather than e.g. electronically, as only a single action is required on the part of the operator to increase or decrease the compartment pressure.

In exemplary embodiments, the valve arrangement further comprises a valve actuator, wherein the inlet actuator and the outlet actuator are integral to the valve actuator.

A single integrated actuator advantageously simplifies the valve arrangement, reducing the required number of components.

In exemplary embodiments, the valve arrangement further comprises a housing defining an interior and an exterior, wherein the valve actuator comprises an interior portion located within the interior of the housing, and an exterior portion located to the exterior of the housing, and wherein the exterior portion is pivotably connected to the housing.

The exterior portion of the valve actuator, and its pivotable connection to the housing, provide a simple rocker by which pressure can be adjusted.

In exemplary embodiments, the valve arrangement further comprises a resilient biasing arrangement configured to resiliently bias the inlet actuator and the outlet actuator towards an inactive position in which the inlet valve and the outlet valve are in a closed position.

In exemplary embodiments, the inlet valve, the outlet valve and the compartment valve are resiliently biased towards a closed position.

Without actuation of the valves, the valves return to a closed state, so that the compartment pressure remains at the level to which it has been adjusted until further actuation of the valves occurs.

In exemplary embodiments, the valve arrangement further comprises a pressure relief valve in fluid communication between the inlet and the compartment port, such that pressure at the compartment port is limited by the pressure relief valve.

In the event of a leakage in the inlet valve, fluid can leave the valve arrangement at the pressure release valve, without affecting the pressure at the compartment port.

In exemplary embodiments, the outlet valve comprises the pressure relief valve.

Incorporation of the pressure relief valve in the outlet valve makes the valve arrangement advantageously compact.

In exemplary embodiments, the valve arrangement comprises a first compartment valve for controlling the flow of fluid into the compartment, and a second compartment valve for controlling the flow of fluid out of the compartment.

Providing a valve to control the flow of fluid to and from the compartment reduces the risk of leakage from the inlet valve increasing the pressure within the compartment, as well as lowering the risk of leakage from the outlet valve reducing the pressure within the compartment. Control of the pressure within the compartment is therefore increased, and can be even more precisely predicted. The pressure within the compartment can be more easily maintained at the desired level, avoiding the need for further adjustment.

In exemplary embodiments, the valve arrangement further comprises an inlet actuator for moving the inlet valve to an open position in which the flow of fluid from the fluid source into the valve arrangement is enabled; and an outlet actuator for moving the outlet valve to an open position in which the flow of fluid out of the valve arrangement is enabled; wherein the inlet actuator is configured to move the first compartment valve to an open position in which the flow of fluid to the compartment is enabled; and the outlet actuator is configured to move the second compartment valve to an open position in which the flow of fluid from the compartment is enabled.

Advantageously, each of the compartment valves can be operated at the same time as the respective inlet or outlet valve, i.e. only a single action of each actuator is needed in order to increase or decrease the compartment pressure—the compartment valves need not be actuated separately. This is of particular advantage where the inlet and outlet actuators are controlled directly by an operator (i.e. the operator applies an actuating force) rather than e.g. electronically, as only a single action is required on the part of the operator to increase or decrease the compartment pressure.

There is yet further provided the use of a pressure adjustment apparatus as set out about in a seat adjustment mechanism, where the pressure adjustment apparatus is configured to actuate adjustment of a seat upon an increase or decrease of pressure within the compartment.

In exemplary embodiments, the pressure adjustment apparatus is configured to actuate adjustment of a vehicle seat.

BRIEF DESCRIPTION OF DRAWINGS

Embodiments will now be described by way of example only, with reference to the accompanying figures, in which:

FIG. 5b is a perspective view of the pressure adjustment unit of FIG. 5a;

DETAILED DESCRIPTION

Figure 1:
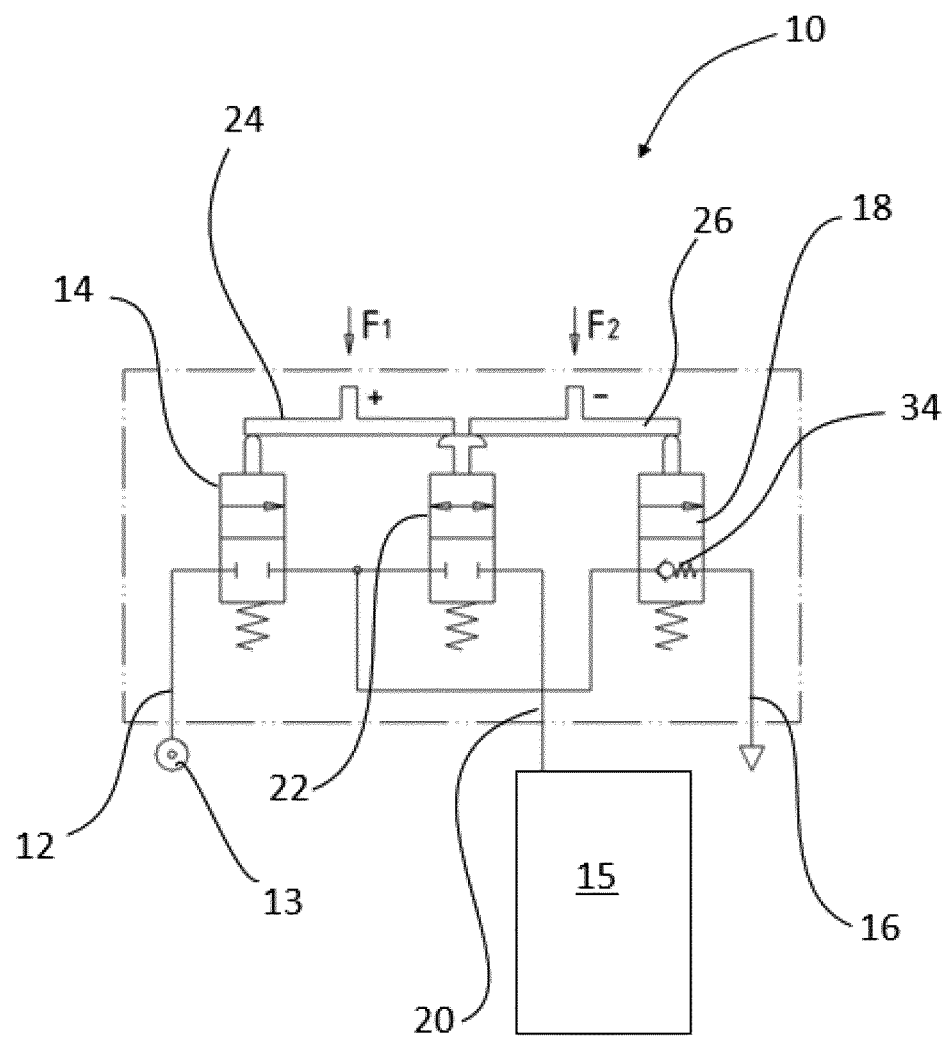
FIG. 1 is a fluid circuit diagram of a valve arrangement according the present teachings.

With reference to FIG. 1, a valve arrangement according to the present teachings is indicated generally at 10. The valve arrangement 10 forms part of a pressure adjustment apparatus for controlling the pressure of a compartment 15. Adjustment of a pressurised compartment may be required in order to carry out adjustment by an increase or decrease in volume of the compartment, e.g. in adjustment of some part of a vehicle seat to increase comfort, or to adjust height of the seat. Alternatively, such a pressurised compartment can be used as an actuator to apply a required force, for example.

Throughout the description of this embodiment the term "fluid" is intended to include liquid or gas. In the described embodiments, the valve arrangement is configured for use with compressed air. However, the pressure adjustment apparatus described herein is suitable for use with other types of gas, or with suitable liquid.

The valve arrangement has an inlet 12 by which the valve arrangement is connected to a pressurised fluid source 13. The valve arrangement has an inlet 12 by which the valve arrangement is connected to a pressurised fluid source 13. An inlet valve 14 is provided to control the flow of fluid from the fluid source 13 into the valve arrangement 10. The valve arrangement 10 has an outlet 16 by which fluid is released from the valve arrangement 10. An outlet valve 18 is provided to control the flow of fluid out of the valve arrangement 10.

The compartment 15 is in fluid communication with the valve arrangement 10 by means of a compartment port 20. A compartment valve is used to control the flow of fluid into and/or out of the compartment. In this embodiment, a single compartment valve 22 is arranged to control the flow of fluid into and out of the compartment.

In alternative embodiments, the compartment valve is arranged to control the flow of fluid either into or out of the compartment. In alternative embodiments, described in further detail below, a compartment inlet valve and a compartment outlet valve are provided in order to control the flow of fluid into and out of the compartment.

The provision of the compartment valve to control the flow of fluid to and from the compartment reduces the risk of leakage from the inlet valve increasing the pressure within the compartment, and reduces the risk of leakage from the outlet valve reducing the pressure within the compartment. A reduction in compartment pressure due to external forces acting on the compartment is avoided, so that the need to re-pressurise the compartment is avoided.

Each of the inlet valve 14, the outlet valve 18 and the compartment valve 22 has an open position where the flow of fluid through the valve is allowed, and a closed position where the flow of fluid through the valve is prevented.

The compartment valve 22 is configured for simultaneous actuation to an open position with the inlet valve and/or the outlet valve. That is, when the inlet valve 14 is moved to an open position, the compartment valve 22 is moved to an open position, so that the flow of fluid into the compartment is enabled, and the compartment pressure is increased. Likewise, when the outlet valve 18 is moved to an open position, the compartment valve 22 is moved to an open position, so that the flow of fluid out of the compartment is enabled, and the compartment pressure is decreased.

The configuration of the valve arrangement such that the compartment valve is open when the inlet valve is open, or open when the outlet valve is open, increases the efficiency of the arrangement, so that a single operation is required in order to adjust the pressure of the compartment.

In this embodiment, the valves 14, 18, 22 are operated by the application of external forces, as indicated by arrows $F_1$, $F_2$ in FIG. 1. Application of a force in the direction as indicated at $F_1$, $F_2$ results in opening of the respective valve. In alternative embodiments, some other suitable type of actuation of the valves is provided.

In this embodiment, the valve arrangement 10 has an inlet actuator 24 for moving the inlet valve 14 to the open position in which the flow of fluid from the fluid source 13 into the valve arrangement is enabled. The compartment valve 22 is moved to the open position at the same time, so that pressure in the compartment 15 is increased.

An outlet actuator 26 is provided for moving the outlet valve 18 to the open position, such that when the compartment valve 22 is the open position, the flow of fluid out of the valve arrangement is enabled, i.e. the pressure of the compartment is decreased.

In this embodiment, the inlet actuator 24 is arranged to operate both the inlet valve 14 and the compartment valve 22 simultaneously; the outlet actuator 26 is likewise configured to operate the outlet valve 18 and the compartment valve 22 simultaneously. A single actuator is thus used to increase or decrease the pressure of the compartment, and a single operation is advantageously required. Adjustment of the compartment pressure is thus efficient, and simply carried out.

Figure 2A:
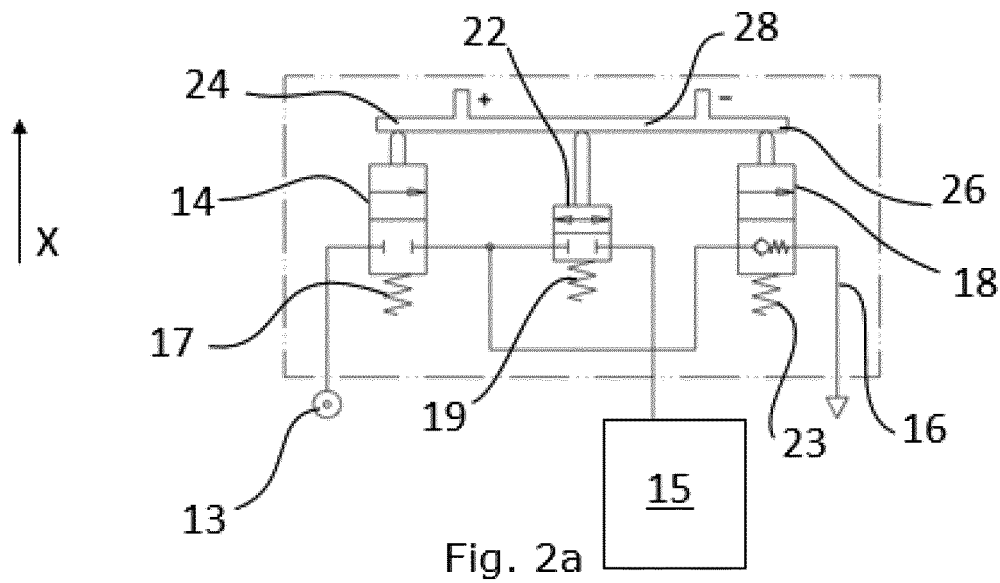
FIG. 2a is a fluid circuit diagram of a further valve arrangement according to the present teachings in a first state.
Figure 2B:
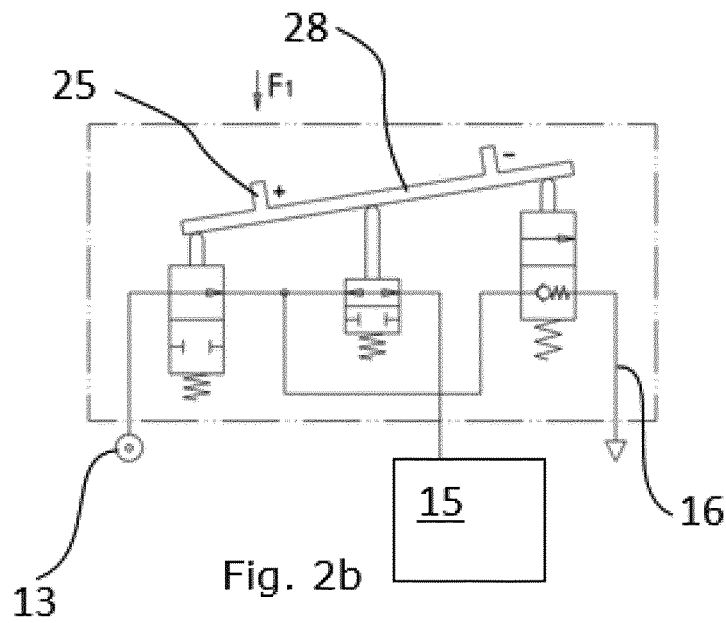
FIG. 2b is a fluid circuit diagram of the valve arrangement of FIG. 2a in a second state.
Figure 2C:
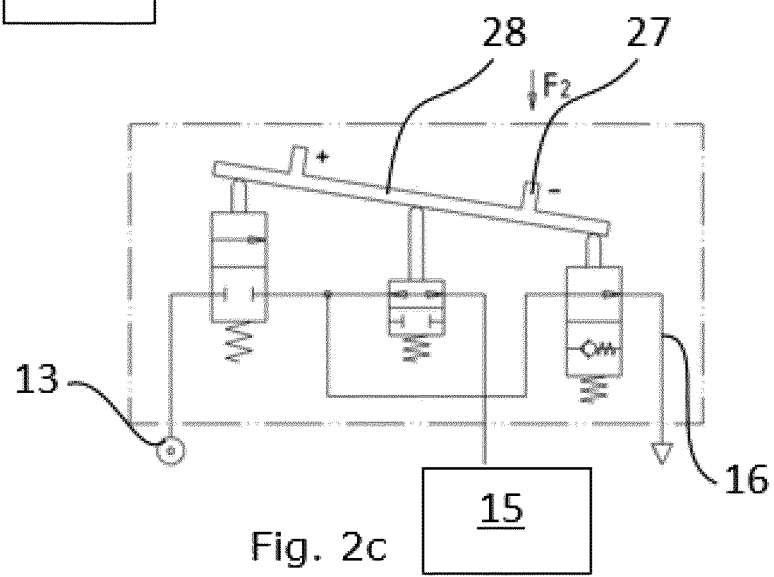
FIG. 2c is a fluid circuit diagram of the valve arrangement of FIG. 2a in a third state.

FIGS. 2a, 2b and 2c show a further embodiment. In this embodiment, the inlet 24 and outlet 26 actuators are combined in a single valve actuator 28. That is, the inlet actuator 24 and the outlet actuator 26 are integral to the valve actuator 28. This single valve actuator 28 simplifies the valve arrangement 10, advantageously reducing the number of components.

As shown in FIGS. 2a, 2b and 2c, the valve actuator 28 also actuates the compartment valve 22. In this embodiment, the valve actuator 28 pivots, upon the application of either force $F_1$, $F_2$, about the compartment valve 22, such that the compartment valve 22 is moved to an open position simultaneously with one or the other of the inlet 14 and the outlet 18 valves.

Each valve 14, 18, 22 has a respective resilient biasing mechanism 17, 19, 23 by which each valve 14, 18, 22 is returned to a closed position. In this embodiment, each resilient biasing mechanism is in the form of a compression spring 17, 19, 23 arranged to act in the direction indicated by arrow X (see FIG. 2a), in the opposite direction to that in which the force $F_1$, $F_2$ is applied, i.e. such that each valve 14, 18, 22 is returned to a closed position in the absence of any force applied in the direction $F_1$, $F_2$.

FIGS. 2a, 2b and 2c show the valve arrangement 10 in different states. In FIG. 2a the valve arrangement 10 is shown in a closed state, i.e. each of the valves 14, 18, 22 is in a closed position as no force is applied to any of the valves via the actuator 28. No fluid can move about the valve arrangement 10. The pressure of the compartment 15 is maintained at a substantially constant level.

FIG. 2b shows the valve arrangement 10 in an open, pressure increasing state. In FIG. 2b, the force $F_1$ is applied to the actuator 28 at a first force application point 25, such that the inlet valve 14 and the compartment valve 22 are moved to the open position.

The first force application point 25 is located between the inlet valve 14 and the compartment valve 22. As in this embodiment the valve actuator 28 is a single component, application of the force $F_1$ at the first force application point 25 causes the valve actuator 28 to pivot about the compartment valve 22. In order that both the inlet valve 14 and the compartment valve 22 can be opened to the required extent by the application of force $F_1$ at the first force application point, the stroke distance of the actuator 28, i.e. the distance of movement, required to open the compartment valve 22 is less than that required to open the inlet valve 14. In this way a single operation on the part of the operator is required to open the inlet valve 14 and the compartment valve 22 and so increase the pressure in the compartment 15.

FIG. 2c shows the valve arrangement 10 in an open, pressure decreasing state. As shown in FIG. 2c, in the pressure decreasing state, the force $F_2$ is applied at a second force application point 27 located on the valve actuator 28 between the outlet valve 18 and the compartment valve 22. As with the application of the force $F_1$, application of the force $F_2$ at the second force application point 27 will result in the pivoting of the valve actuator 28 about the compartment valve 22. Again, a greater actuator stroke distance is applied at the outlet valve 18 to an open position than is applied at the compartment valve 22 due to the pivoting action of the valve actuator 28. The stroke required to move each valve 18, 22 to a fully open position is adjusted accordingly, i.e. less actuation distance is required to move the compartment valve 22 to a suitably open position than that required to move the outlet valve 18 to a suitably open position.

A single operation by the operator is required to open the outlet valve 18 and the compartment valve 22 and so decrease the pressure in the compartment 15. The use of a single compartment valve 22 reduces the risk of leakage, because there is only a single valve, and advantageously allows a more compact design.

Figure 3A:
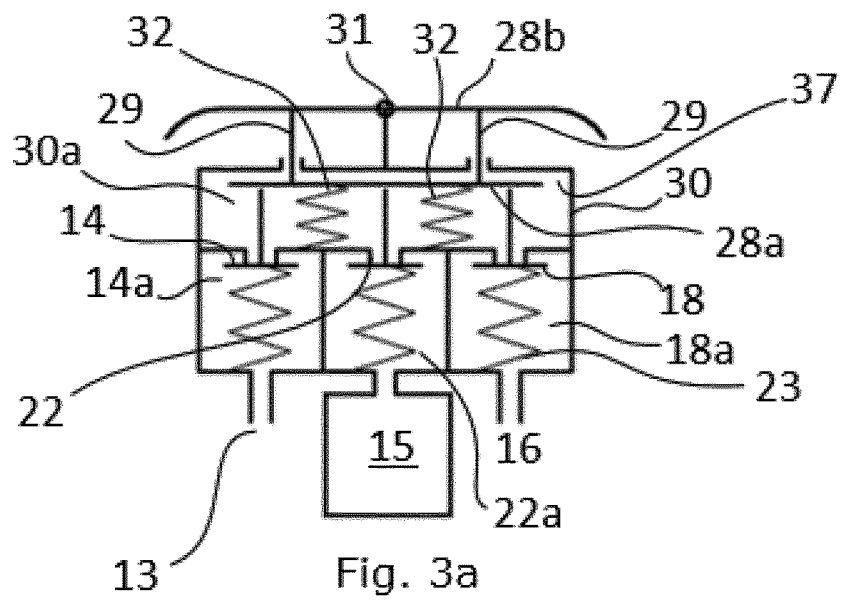
FIG. 3a is a cross-sectional view of the valve arrangement of FIGS. 2a-2c in said first state
Figure 3B:
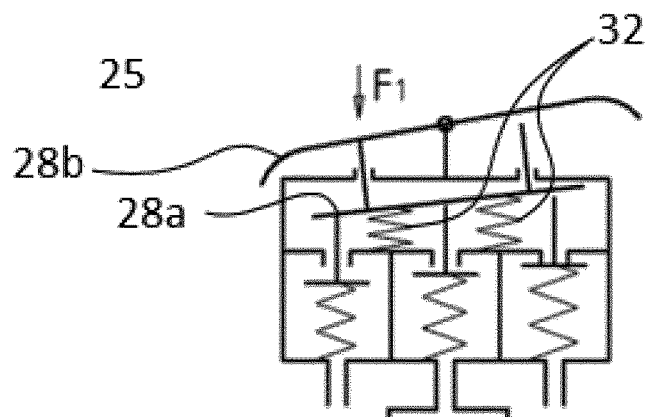
FIG. 3b is a cross-sectional view of the valve arrangement of FIGS. 2a-2c in said second state.
Figure 3C:
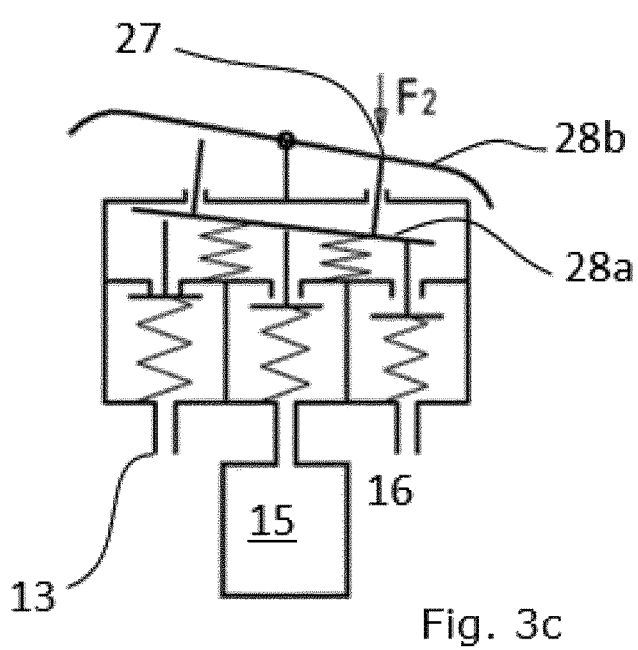
FIG. 3c is a cross-sectional view of the valve arrangement of FIGS. 2a-2c in said third state.

With reference now to FIGS. 3a, 3b and 3c, the valve arrangement 10 of this embodiment is located within a housing 30. The housing defines an interior 30a in which the valves 14, 18, 22 are housed, and an exterior 30b. The valve arrangement 10 is configured for operation from the exterior 30b of the housing 30.

To this end, the valve actuator 28 of this embodiment has an interior portion 28a and an exterior portion 28b. The interior portion 28a is located within the interior 30a of the housing 30. The exterior portion 28b is located to the exterior 30b of the housing. The valve arrangement 10 is operated by manipulation of the exterior portion 28b of the valve actuator 28 by a user. In this embodiment, the exterior portion 28b is pivotably mounted to a housing 30 at a pivotable joint 31. The valve actuator 28 is thus pivotably supported on the housing 30.

The exterior portion 28b of the valve actuator 28 is connected to the interior portion 28a at two points, so that force applied at $F_1$ or $F_2$ (see FIGS. 3b and 3c) causes actuation of the inlet valve 14 and the compartment valve 22, or the outlet valve 18 and the compartment valve 22, respectively. In this embodiment, the exterior portion 28b is connected to the interior portion 28a by two connecting arms 29, each arm 29 positioned either side of the pivotable joint 31.

In this embodiment, the interior portion 28a and the exterior portion 28b are integral to the valve actuator 28. In alternative embodiments, the interior and exterior portions of the valve actuator are separate components fitted together such that the exterior portion is used to manipulate the interior portion and so operate the valve arrangement.

In this embodiment, the valve arrangement has a resilient biasing arrangement 32 configured to resiliently bias the actuator 24 and the outlet actuator 26 towards an inactive position where the inlet valve 14 and the outlet valve 18 are in a closed position, i.e. as shown in FIG. 3a. In this embodiment, the resilient biasing arrangement is in the form of compression springs 32. The springs 32 are arranged to act between the interior portion 28a of the valve actuator 28, and the housing 30. In alternative embodiments, some other suitable resilient biasing arrangement is used.

In alternative embodiments, the valve actuator 28 is resiliently biased towards a closed position by a single spring, or by more than two springs.

The housing 30 defines four chambers: a chamber 14a, 18a, 22a for each of the respective valves 14, 18, 22; and an actuator chamber 37 in which the interior portion 28a is located. Each of the valve chambers 14a, 18a, 22a has a sealing seat 14, 18, 22 resiliently biased towards a closed position by the respective spring 17, 19, 23.

In the unactuated state shown by FIG. 3a, the valve actuator 28 has no contact with the seals 14, 18, 22, so that the seals 14, 18, 22 can return unhindered to the closed position.

As shown in FIGS. 1-2c, the valve arrangement 10 includes a pressure relief valve 34. In this embodiment, the pressure relief valve 34 is integral to the outlet valve 18, although in alternative embodiments the pressure relief valve is located elsewhere in the valve arrangement. The pressure relief valve 34 is configured to avoid over-pressurisation of the valve arrangement 10 and so avoid potential damage. In this embodiment, the spring force of the spring 23 of the outlet valve 18 is such that the spring 23 acts as a pressure relief valve 34. Should the pressure exceed the opening pressure of the pressure relief valve 34, the valve 34 is opened and fluid can escape the valve arrangement by the outlet 16.

Figure 4:
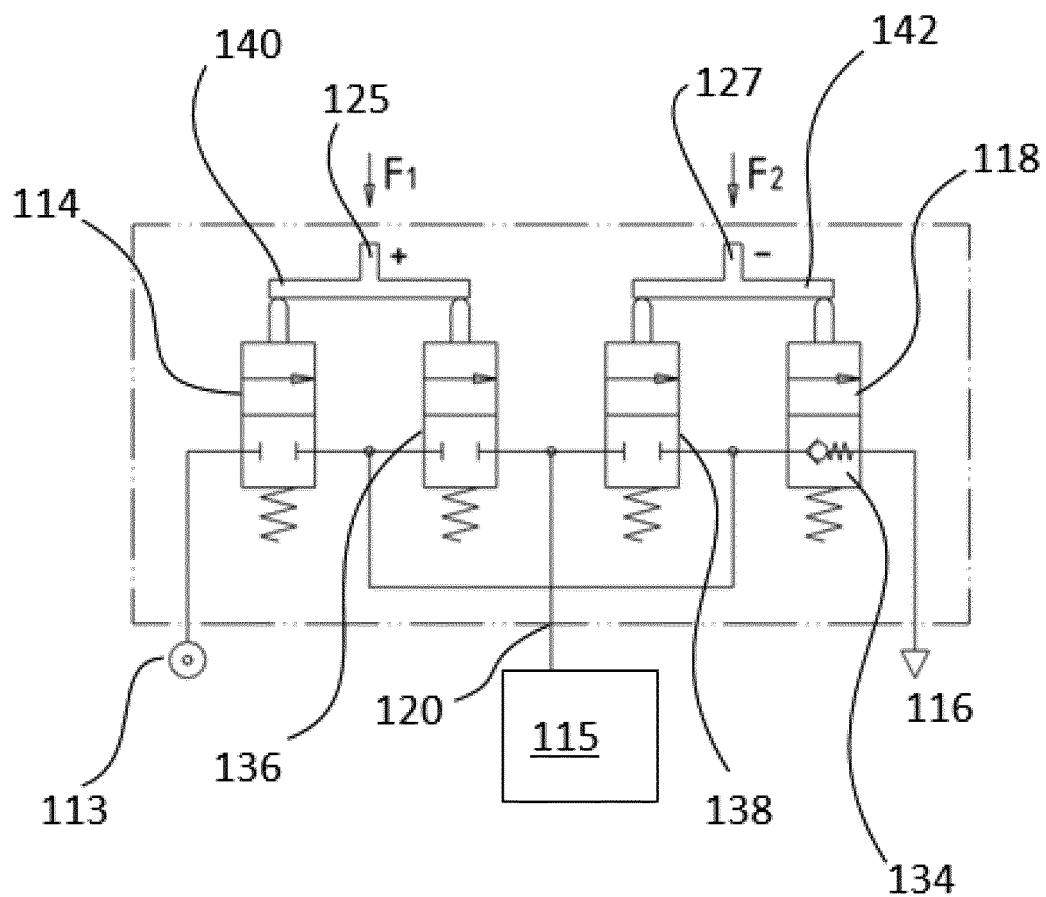
FIG. 4 is a fluid circuit diagram of a further valve arrangement according to the present teachings.

FIG. 4 shows an alternative embodiment, where like components to those of the previous embodiments have the same reference number, with the additional prefix "1".

The valve arrangement 110 shown in FIG. 4 has two compartment valves 136, 138. The first compartment valve 136 is an inlet compartment valve for controlling the flow of the fluid into the compartment 115. The second compartment valve 138 is an outlet compartment valve 138, and is used to control the flow of fluid from the compartment 115.

The inlet compartment valve 136 is arranged for actuation with the inlet valve 114 upon application of the force F 1 at the first force application point 125. The outlet compartment valve 138 is arranged for actuation with the outlet valve 118 upon application of the force F 2 at the second force application point 127. The valve arrangement 110 of this embodiment has an inlet actuator 140 for actuation of the inlet valve 114 and the inlet compartment valve 136 to the open position, and an outlet actuator 142 for actuation of the outlet compartment valve 138 and the outlet valve 118 to the open position. As in the previous embodiment, only one operation is required in order to decrease or increase the pressure of the compartment 115.

Advantageously, the provision of separate actuators 140, 142 for each operation enables freedom of design in that the location of the force application points 125, 127 is not dictated by the relation of one to the other.

To ensure function of the pressure relief valve, the inlet valve 114 is connected in parallel with the outlet valve 118.

In this arrangement, slight leakage at the pressure relief valve does not affect the compartment pressure, so that there is no requirement for sealing at the pressure relief valve. Any leakage at the inlet valve 114 is diverted by the pressure relief valve without influencing the compartment pressure. The pressure peak at the compartment port 120 is effectively shut off by the compartment valves 136, 138 so that no fluid escapes and the same pressure of the compartment 115 can once again be reached. At the compartment port 120, the possibility of valve related pressure loss at the compartment 115 due to valve leakage is limited to the compartment valves 136, 138. Any leakage at these compartment valves 136, 138 will be lower than that at the pressure relief valve 134.

Figure 5A:
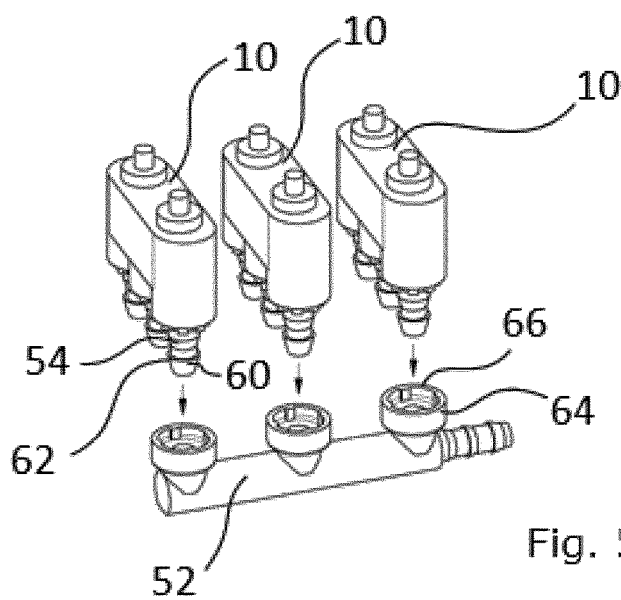
FIG. 5a is an exploded perspective view of a pressure adjustment unit according to the present teachings.
Figure 5B:
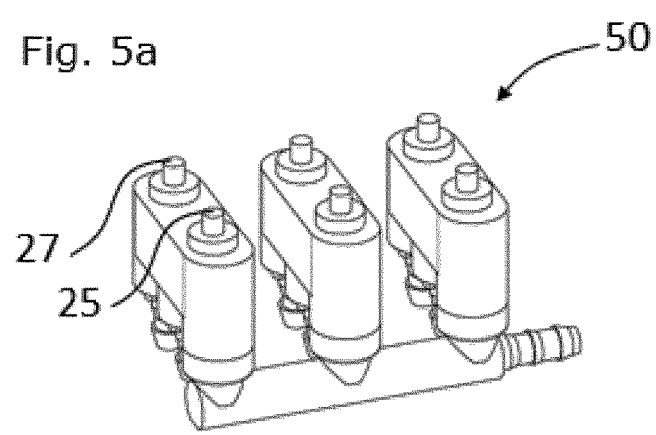
Figure 5C:
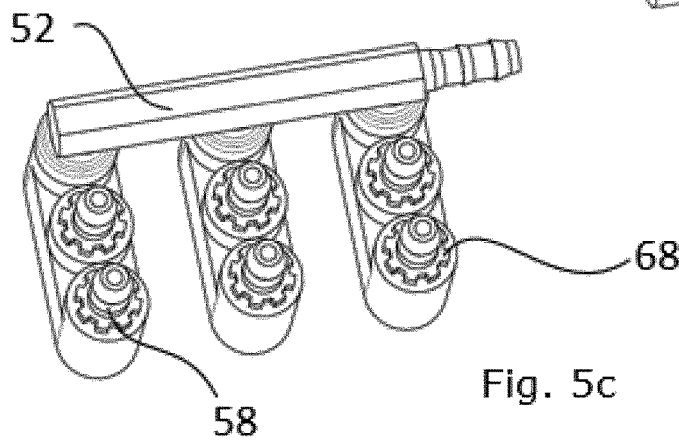
FIG. 5c is a perspective view of the pressure adjustment unit of FIGS. 5a and 5b.
Figure 5D:
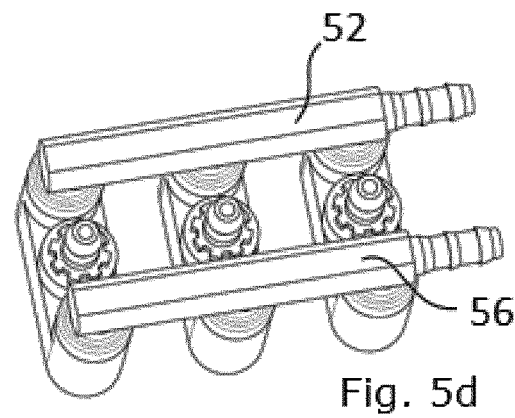
FIG. 5d is a perspective view of the pressure adjustment unit of FIGS. 5a to 5c.

FIGS. 5a, 5b, 5c and 5d show a pressure adjustment unit 50 made up of multiple valve arrangements 10 connected to an inlet conduit 52 and, in FIG. 5d, an outlet conduit 56. Advantageously, a common inlet conduit 52 is used to connect multiple valve arrangements 10 to a common pressurised fluid source 13 (see FIG. 1). As shown in FIG. 5d, the connection of multiple valve arrangements 10 to a common outlet conduit 56 allows a common outlet to be used for the release of fluid from each valve arrangement 10. Use of common inlet and outlet conduits 52, 56 provides a simpler, more compact arrangement where multiple valve arrangements 10 are required. Each valve arrangement 10 can be used for a different purpose, i.e. so that each valve arrangement 10 can be connected to a respective compartment 15.

Each valve arrangement 10 is connected to the inlet conduit 52 by an inlet connector 54, and to the outlet conduit 56 by an outlet connector 58. In this embodiment, each of the inlet and outlet conduits, 52, 56 defines a series of receiving portions 64.

Each receiving portion is configured to receive an inlet connecter 54 or outlet connecter 58 in sealing engagement, so that leakage or fluid at the point of connection is inhibited. The inlet and outlet connectors 54, 58 serve to attach, hold and seal a conduit or hose 52, 56. In this embodiment, each inlet connector 54 and outlet connector 58 comprises a projection 60 configured to be received in a respective receiving portion 64. The projections 60 are substantially circular in cross section, although in alternative embodiments some other suitable shape of projection is provided.

Each projection 60 has at least one barb 62 for engagement with a corresponding formation of the respective receiving portion 64 to aid attachment of the valve arrangement 10 to the conduits 52, 56. In alternative embodiments, some other suitable means of engagement is used.

The inlet and outlet connectors 54, 58 each define a location portion 68 (see FIG. 5c). The location portion of this embodiment is a formation 68 arranged to fit into a correspondingly shaped formation 66 of the respective receiving portion 64. In this embodiment, as shown in FIG. 5c, the formation is a series of teeth 68 arranged about the connector 54, 58, and each receiving portion 64 has a series of corresponding cut outs 66 (see FIG. 5a) configured to receive the teeth. In alternative embodiments, a location arrangement of some alternative shape is provided. The formations 66, 68 inhibit rotation of the connectors in relation to the conduits, so inhibiting rotation of the valve arrangements with respect to the conduits. The risk of the conduits becoming loose, leading to leakage, is thus reduced.

The described embodiments are suitable for use as a seat adjustment mechanism, where the increase or decrease of pressure from the compartment 15 leads to adjustment of a seat. For example, the pressure adjustment apparatus can be used to adjust the lumbar portion of a seat to increase comfort, in particular in commercial vehicles where long journeys are undertaken and the driver can expect to be seated for a long period of time. However, the pressure adjustment apparatus described is suitable for use in multiple other applications.

The valve arrangement 10 is suitable for actuation by an electric drive as well as by fluid actuation.

The valve arrangement described allows more precise adjustment of the compartment pressure due to the compartment valve or valves. In addition, pressure drop caused by the pressure relief valve or external pressure on the compartment is avoided. Leakage at the inlet valve does not cause unwanted increase of the compartment pressure.

The use of a single actuator to operate the compartment valve or valves and the inlet or outlet valve improves efficiency of use and allows a more compact design. The valve arrangement can be fitted to existing pressure adjustment systems without the need for substantial redesign.

The invention claimed is:

1. A pressure adjustment apparatus comprising:
   a compartment; and
   a valve arrangement for controlling pressure of the compartment,
   wherein the valve arrangement comprises:
      an inlet, for connecting the valve arrangement to a pressurized fluid source, and an inlet valve, for controlling flow of fluid from the pressurized fluid source into the valve arrangement,
      an outlet, for releasing fluid from the valve arrangement, and an outlet valve, for controlling the flow of fluid out of the valve arrangement,
      a compartment port by which the compartment is connected to the valve arrangement, and
      at least one compartment valve for controlling the flow of fluid into or out of the compartment,
      wherein the at least one compartment valve is configured for simultaneous actuation to an open position with the inlet valve or the outlet valve, such that when either the inlet valve or the outlet valve is in a respective open position, the at least one compartment valve is in the open position, such that the flow of fluid into or out of the compartment is allowed.

2. The pressure adjustment apparatus of claim 1, wherein the valve arrangement further comprises:
   an inlet actuator for moving the inlet valve to the respective open position in which the flow of fluid from the pressurized fluid source into the valve arrangement is enabled; and
   an outlet actuator for moving the outlet valve to the respective open position in which the flow of fluid out of the valve arrangement is enabled, wherein one or both of the inlet actuator and the outlet actuator is configured to move the at least one compartment valve to the open position in which the flow of fluid to or from the compartment is enabled.

3. The pressure adjustment apparatus of claim 2, wherein the valve arrangement comprises a valve actuator, wherein the inlet actuator and the outlet actuator are integral to the valve actuator, and wherein the pressure adjustment apparatus further comprises:
   a housing defining an interior and an exterior, wherein the valve actuator comprises an interior portion located within the interior of the housing, and an exterior portion located to the exterior of the housing, and wherein the exterior portion is pivotably connected to the housing.

4. The pressure adjustment apparatus of claim 2, further comprising:
   a resilient biasing arrangement configured to resiliently bias the inlet actuator and the outlet actuator towards an inactive position in which the inlet valve, the outlet valve, and the at least one compartment valve are in a closed position.

5. The pressure adjustment apparatus of claim 1, wherein the inlet valve, the outlet valve, and the at least one compartment valve are resiliently biased towards a closed position.

6. The pressure adjustment apparatus of claim 1, wherein the valve arrangement further comprises a pressure relief valve in fluid communication between the inlet and the compartment port, such that pressure at the compartment port is limited by the pressure relief valve, wherein the outlet valve comprises the pressure relief valve.

7. The pressure adjustment apparatus of claim 1, wherein the at least one compartment valve comprises a first compartment valve for controlling the flow of fluid into the compartment, and a second compartment valve for controlling the flow of fluid out of the compartment, wherein the valve arrangement further comprises:
an inlet actuator for moving the inlet valve to the respective open position in which the flow of fluid from the pressurized fluid source into the valve arrangement is enabled; and
an outlet actuator for moving the outlet valve to the respective open position in which the flow of fluid out of the valve arrangement is enabled, wherein the inlet actuator is configured to move the first compartment valve to the open position in which the flow of fluid to the compartment is enabled, and the outlet actuator is configured to move the second compartment valve to the open position in which the flow of fluid from the compartment is enabled.

8. A pressure adjustment unit comprising two or more of the pressure adjustment apparatus of claim 1, the pressure adjustment unit comprising:
an inlet conduit for connecting each valve arrangement to the pressurized fluid source, wherein the inlet of each valve arrangement comprises an inlet connector, and wherein the inlet of each valve arrangement is connected to the inlet conduit by a respective inlet connector.

9. The pressure adjustment unit of claim 8, further comprising:
an outlet conduit for releasing fluid from each valve arrangement, wherein the outlet of each valve arrangement comprises an outlet connector, and wherein the outlet of each valve arrangement is connected to the outlet conduit by a respective outlet connector.

10. The pressure adjustment unit of claim 9, wherein each inlet connector or outlet connector comprises:
a projection configured to engage a respective inlet conduit or a respective outlet conduit, wherein each projection is substantially circular in cross-section, wherein each projection comprises at least one barb configured for engagement with the respective inlet conduit or the respective outlet conduit, wherein each conduit defines receiving portions each configured to receive the respective inlet connector or the respective outlet connector, and wherein each receiving portion defines a location portion shaped to correspond with a corresponding location portion of the inlet connector or the outlet connector.

11. A valve arrangement for a pressure adjustment apparatus for a compartment, the valve arrangement comprising:
an inlet, for connecting the valve arrangement to a pressurized fluid source, and an inlet valve, for controlling flow of fluid from the pressurized fluid source into the valve arrangement;
an outlet, for releasing fluid from the valve arrangement, and an outlet valve, for controlling the flow of fluid out of the valve arrangement;
a compartment port for connecting said compartment to the valve arrangement; and
at least one compartment valve for controlling the flow of fluid into or out of said compartment,
wherein the at least one compartment valve is configured for simultaneous actuation to an open position with the inlet valve or the outlet valve, such that when either the inlet valve or the outlet valve is in a respective open position, the at least one compartment valve is in the open position, such that the flow of fluid into or out of the compartment is allowed.

12. The valve arrangement of claim 11, further comprising:
an inlet actuator for moving the inlet valve to the respective open position in which the flow of fluid from the pressurized fluid source into the valve arrangement is enabled; and
an outlet actuator for moving the outlet valve to the respective open position in which the flow of fluid out of the valve arrangement is enabled, and wherein one or both of the inlet actuator and the outlet actuator is configured to move the at least one compartment valve to the open position in which the flow of fluid to or from said compartment is enabled.

13. The valve arrangement of claim 12, further comprising:
a valve actuator, wherein the inlet actuator and the outlet actuator are integral to the valve actuator; and
a housing defining an interior and an exterior, wherein the valve actuator comprises an interior portion located within the interior of the housing, and an exterior portion located to the exterior of the housing, and wherein the exterior portion is pivotably connected to the housing.

14. The valve arrangement of claim 12, further comprising:
a resilient biasing arrangement configured to resiliently bias the inlet actuator and the outlet actuator towards an inactive position in which the inlet valve and the outlet valve are in a closed position.

15. The valve arrangement of claim 11, wherein the inlet valve, the outlet valve, and the at least one compartment valve are resiliently biased towards a closed position.

16. The valve arrangement of claim 11, further comprising:
a pressure relief valve in fluid communication between the inlet and the compartment port, such that pressure at the compartment port is limited by the pressure relief valve, wherein the outlet valve comprises the pressure relief valve.

17. The valve arrangement of claim 11, wherein the at least one compartment valve comprises:
a first compartment valve for controlling the flow of fluid into the compartment, and a second compartment valve for controlling the flow of fluid out of the compartment.

18. The valve arrangement of claim 17, further comprising:
an inlet actuator for moving the inlet valve to the respective open position in which the flow of fluid from the pressurized fluid source into the valve arrangement is enabled; and
an outlet actuator for moving the outlet valve to the respective open position in which the flow of fluid out of the valve arrangement is enabled, wherein the inlet actuator is configured to move the first compartment valve to the open position in which the flow of fluid to the compartment is enabled, and the outlet actuator is configured to move the second compartment valve to the open position in which the flow of fluid from the compartment is enabled.

19. A method of using a pressure adjustment apparatus in an adjustment mechanism, wherein the pressure adjustment apparatus comprises: a compartment, and a valve arrangement for controlling pressure of the compartment, wherein the valve arrangement comprises: (i) an inlet, for connecting the valve arrangement to a pressurized fluid source, and an inlet valve, for controlling flow of fluid from the pressurized fluid source into the valve arrangement, (ii) an outlet, for releasing fluid from the valve arrangement, and an outlet valve, for controlling the flow of fluid out of the valve arrangement, (iii) a compartment port by which the compartment is connected to the valve arrangement, and (iv) a compartment valve for controlling the flow of fluid into or out of the compartment, wherein the method comprises:
   simultaneous actuating the compartment valve to an open position with the inlet valve or the outlet valve, such that when either the inlet valve or the outlet valve is in a respective open position, the compartment valve is in the open position, thereby allowing the flow of fluid into or out of the compartment; and
   actuating the adjustment mechanism upon an increase or decrease of pressure within the compartment.

\* \* \* \* \*